May 12, 1936.  J. KOPELIOWITSCH  2,040,697
GROUNDING COIL TUNING SYSTEM
Filed Jan. 17, 1931
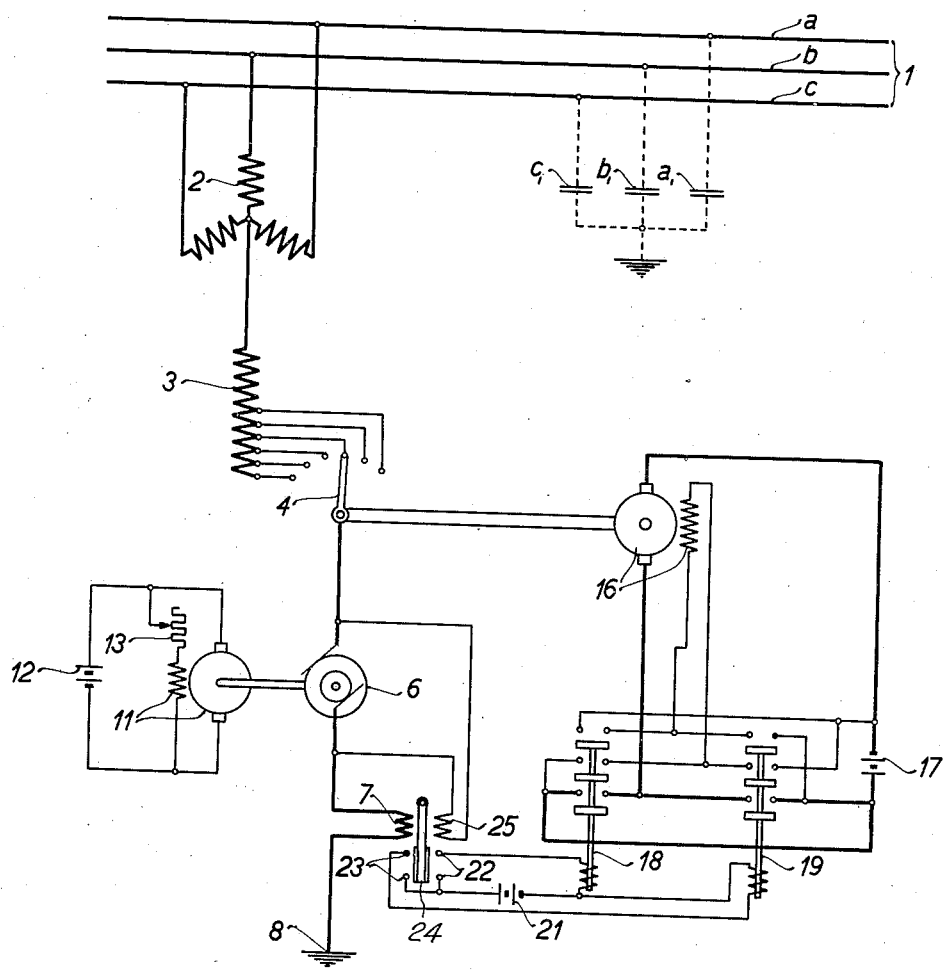
Inventor
Jakob Kopeliowitsch
By *Alfred H. Dyson*
Attorney Patented May 12, 1936

2,040,697

UNITED STATES PATENT OFFICE 2,040,697

GROUNDING COIL TUNING SYSTEM

Jakob Kopeliowitsch, Baden, Switzerland, assignor to Aktiengesellschaft Brown Boveri & Cie., Baden, Switzerland, a joint-stock company of Switzerland Application January 17, 1931, Serial No. 509,371
In Germany January 18, 1930

17 Claims. (Cl. 172—237)

This invention relates to improvements in means for protecting grounded high voltage alternating current transmission lines or apparatus and particularly to means for maintaining the grounded choke coils in an electric system at substantial resonance or other pre-determined tuning with the capacities relative to ground at the system frequency.

Grounded choke coils are frequently used to furnish protection for high-voltage electric apparatus or transmission lines. According to the invention, such coils may be tuned with the capacity of the line for the system or other frequency by imposing an alternating current of such frequency on the grounded system as to obtain a minimum value for the current in the grounded system. A motor generator set may be connected with the grounded system and its speed may be varied to secure variable frequency until the minimum value of the current is reached. It is, however, frequently desired that the choke coil circuit remain in substantial resonance or at another pre-determined tuning regardless of the conditions of the line or that the coil retain the pre-determined tuning during operation for the reason that the coil would not operate satisfactorily if the tuning differs too widely from the pre-determined tuning. When the feeders connected to a transmission line continuously vary in number and size, a continuous regulation of the inductivity of the coils is necessary if the protection rendered by the coils is to remain constant in effect. It has been proposed to adapt the inductivity of the choke coil automatically to the momentary condition of the system, upon deviation of the resonant frequency of the circuit formed by the coil and the line capacities from the system frequency, by means responsive to frequency variations so that the ground current upon the occurrence of a ground in the system drops to the lowest value. Such arrangement is however not the most desirable because it is difficult to determine the limiting current.

It is well-known that the phase angle between the vector of voltage and the vector of current, upon complete resonance, is zero. If this phase angle is measured, the variation from resonance of the choke coil may be determined. This may be done by imposing upon the system, a voltage having the operating or any other frequency as may be desired and by determining the phase angle between voltage and current by suitable means. A certain variation from resonance may therefor be continuously maintained if the imposed frequency is so adjusted that the tuned circuit is in resonance with the imposed frequency as indicated by zero phase angle provided the imposed frequency differs from the operating frequency by a suitable amount. The inductivity of the choke coil may be increased, with a leading current, by the operation of a tap changer or tap switch by means of a phase sensitive relay until the phase angle is reduced to zero and may be decreased, with a lagging current, in the same manner until the phase angle is again zero.

It is, therefore, among the objects of the present invention to provide a system for the tuning of the grounded choke coils for high voltage circuits by the use of an alternating voltage imposed on the grounded circuit.

Another object of the invention is to provide a system for the tuning of grounded choke coils for high voltage networks by the use of an alternating voltage of an arbitrary frequency imposed on the grounded system.

Another object of the invention is to provide a system for the tuning of grounded choke coils for high voltage networks in which a relay controls the tap changing of a tapped choke coil.

Another object of the invention is to provide a system for tuning grounded choke coils of high voltage electric lines or apparatus in which a relay, responding to the phase angle between current and voltage in the grounded system, controls the amount of choke coil inductance connected in the system.

Objects and advantages, other than those above set forth, will be apparent from the following description when read in connection with the accompanying drawing which diagrammatically illustrates one embodiment of the present invention.

Referring more particularly to the drawing by characters of reference, the reference numeral 1 designates an alternating current transmission line having electrical apparatus 2 connected therewith. The neutral point of the apparatus 2 is connected with a tapped choke coil 3 which is connected through a tap switch 4, an alternating current generator 6 and a coil 7 to ground as at 8. The partial capacities of the several phases $a$, $b$ and $c$ of the transmission line 1 to ground are represented at $a_1$, $b_1$, and $c_1$.

The generator 6 is operated by a motor 11 which is energized by a source of current 12. The field current of motor 11 is controlled by an adjustable resistance 13. The speed of the motor may therefore be controlled to supply any desired frequency from the generator to the circuits including the tap switch 4, the choke coil 3, the apparatus 2, the capacities $a_1$, $b_1$, $c_1$, ground and the coil 7.

The tap switch 4 is operated by a reversible motor 16 supplied from a source of current 17 through circuits controlled by a pair of relays 18 and 19. The coils of the relays 18 and 19 are energized from a source of current 21 in response to the bridging of contacts 22 or 23 by an armature 24 of a phase sensitive or power factor relay including the current coil 7 above mentioned and a voltage coil 25 of any well-known type.

If the relay 7, 24, 25 is energized by a leading current, armature 24 bridges contacts 22 which causes energization of the coil of relay 18. Relay 18 closes the circuit to motor 16 which rotates and rotates tap switch 4 in such direction as to cause an increase in the inductivity of choke coil 3 due to the increase in the number of turns connected in circuit. During the tap changing operation, the current therefore gradually shifts to reduce its phase angle to zero. When the phase angle is zero, armature 24 opens contact 22, relay 18 drops, motor 16 and tap changer 4 stop rotating. If the current in the coils 7, 24, 25 lags, the armature 24 bridges contacts 23 which causes energization of the coil of relay 19. The circuits to motor 16 are then closed by relay 19 to cause rotation of motor 16 and tap changer 4 in the opposite direction from that given above thereby causing a decrease in the inductivity of the choke coil 3 by decreasing the number of turns in circuit. As soon as the phase angle has been reduced to zero, the armature 24 returns to its normal position as above described. It will be understood that one of the above operations takes place each time the system connections are changed or any change in the system is brought about which produces a change in the capacity to ground and therefore changes the resonant frequency of the system. If a resonant frequency of the circuit is desired, differing from the operating frequency, such tuning may also be obtained by setting relay 7, 24, 25 at a certain phase angle corresponding to the desired tuning. For this purpose, the phase relay must then be provided with the necessary adjustable contacts and generator 6 delivers current at the operating frequency.

Although but one embodiment of the present invention has been illustrated and described, it will be apparent to those skilled in the art that various changes and modifications may be made therein without departing from the spirit of the invention or from the scope of the appended claims.

The invention claimed is:

1. In a protective system, an alternating current circuit having capacitance to ground, a reactance device connected with said circuit and with ground, a source of alternating current of predetermined voltage frequency so connected as to cause current to flow therefrom by way of said capacitance and said device, and means operable responsive to the said flow of current for adjusting the reactance of said device to resonance with said capacitance at said voltage frequency.

2. In a protective system, an alternating current circuit having capacitance to ground, a reactance device connected with said circuit and with ground, a source of alternating current so connected with said circuit and with ground as to cause current to flow therefrom by way of said capacitance and said device, and means operable responsive to the said flow of current for adjusting the reactance of said device to resonance with said capacitance at a predetermined frequency.

3. In an electrical protective system, an alternating current transmission line, apparatus connected with said line, a variable reactance coil connected with said apparatus and with ground, means for imposing a voltage of a predetermined frequency on the system, and means including a relay for controlling the reactance of said coil responsive to the phase angle between said voltage and current produced thereby in said line and said apparatus to tune said coil to said frequency with the capacitance of said line to ground.

4. In a system for tuning reactance coils in a high-voltage system, an alternating current transmission line having capacitance to ground, apparatus connected with said line, a reactance coil connected with said apparatus and with ground, means for imposing a voltage of an adjustable frequency on the system, and means including a relay responsive to the phase angle between the last said voltage and current produced thereby in said line and in said apparatus for tuning said coil to resonance with said capacitance at a pre-determined frequency.

5. In a system for tuning reactance coils in a grounded neutral high-voltage system, an alternating current transmission line having capacitance to ground, apparatus connected with said line, a reactance coil connected with said apparatus and with ground, an adjustable generator connected in series with and supplying a voltage of pre-determined frequency to said coil, and means for varying the inductivity of said coil to tune the same to resonance with said capacitance at a pre-determined frequency.

6. In a protective system, an alternating current circuit having capacitance to ground, apparatus connected with said circuit, a tapped reactance coil connected with said apparatus and with ground, a tap-changing switch operable to vary the number of effective turns of said coil, means for operating said switch, a source of alternating current so connected with said circuit and with ground as to cause current to flow therefrom by way of said capacitance and said coil, and means comprising a relay operable responsive to said flow of current upon the occurrence of variations in said capacitance for controlling the first said means.

7. In an electrical protective system, an alternating current transmission line having capacitance to ground, apparatus connected with said line, a tapped reactance coil connected with said apparatus and with ground, a tap switch to vary the number of turns of said coil in circuit, a reversible motor for operating said tap switch, and means including a relay responsive to the phase angle between current and voltage in said line and said apparatus for controlling the operation of said motor to thereby effect the tuning of said coil to resonance with said capacitance at a pre-determined frequency.

8. In a system for tuning reactance coils in a grounded neutral high-voltage system, an alternating current transmission line having capacitance to ground, apparatus connected with said line, a tapped reactance coil connected with said apparatus and with ground, a tap switch to vary the number of turns of said coil in circuit, a reversible motor for operating said tap switch, relays controlling the direction of operation of said motor, means for imposing a voltage of adjustable frequency on the system, a relay responsive to variations in the phase angle between the last said voltage and current produced thereby in said line and in said apparatus to control the operation of said first-mentioned relays to thereby maintain said coil tuned to resonance with said capacitance at a pre-determined frequency.

9. In combination with an electrical system comprising an alternating-current apparatus having a neutral point and an inductor connected between said neutral point and the ground, means for indicating the degree of tuning of said inductor with respect to the system capacitance to ground.

10. In an alternating-current system comprising a neutral grounding reactor disposed for tuning to approximate resonance with the system conductor capacitance to ground, means for indicating the degree of tuning of said reactor comprising an auxiliary source of alternating-current potential, means for impressing said potential between the ground and the system conductors, and indicating means responsive to the magnitude and phase position of the current caused to flow by said potential.

11. In an electrical protective system, comprising, an alternating-current transmission line having capacitance, electrical apparatus connected to said line and having a neutral point, a variable reactance device connected between said neutral point and the ground, the combination of means for impressing an alternating electromotive force of arbitrary frequency on said system, means for varying the reactance of said device, and means responsive to the phase relation between said electromotive force and the current flowing through said reactance device and said capacitance for controlling said reactance varying means.

12. In a high voltage transmission system having changeable capacitance to ground, the combination of, a device associated with said system and having an electrical neutral point, an adjustable inductance connected between said neutral point and ground, means for impressing a voltage of predetermined frequency upon said system to cause current to flow through said inductance and said capacitance, and means responsive to the phase of said current relative to said voltage for adjusting said inductance to resonance with said capacitance of said system at said frequency.

13. In combination, a transmission line having impressed thereon a voltage of predetermined frequency and having capacitance to ground, an apparatus connected to said line and having an electrical neutral point, a varible tuning inductance connected between said neutral point and ground, means for impressing on said line and said apparatus a voltage differing in frequency from said predetermined frequency to cause current to flow through said inductance and said capacitance, and means responsive to the phase relation of said current and the last said voltage for automatically tuning said inductance to resonance with said capacitance at the second said frequency.

14. In combination, a high voltage alternating-current transmission line having capacitance to ground, a neutral grounding reactor connected between a neutral point of said line and ground, an auxiliary source of alternating current so connected as to cause current to flow through said capacitance and said reactor, and means responsive to said current for automatically tuning said reactance to resonance with said capacitance at a predetermined frequency.

15. In combination, an alternating-current transmission line having impressed thereon a voltage of predetermined frequency and having capacitance to ground, a neutral grounding reactor connected between a neutral point of said line and ground, an auxiliary source of alternating current so connected as to cause current to flow through said capacitance and said reactor, and means for maintaining a constant phase angle between said current and the voltage of said source by automatically adjusting said inductance upon change of said capacitance.

16. In a protective system, an alternating current circuit of predetermined voltage frequency and having variable capacitance to ground, a reactance device connected with said circuit and with ground, a source of alternating current so connected with said circuit and with ground as to cause current to flow therefrom by way of said capacitance and said device, and means operable responsive to the said flow of current upon the occurrence of variations in said capacitance for adjusting said device to substantial resonance with said capacitance at the voltage frequency of said circuit.

17. The combination with an electrical system having capacitance to ground and comprising an alternating-current apparatus having a neutral point connection, and an inductor connected between said neutral point and ground, of means operable responsive to changes in current in said inductor resulting from changes in said capacitance for varying the degree of tuning of said inductor with respect to the system capacitance to ground.

JAKOB KOPELIOWITSCH.